(12) United States Patent
He et al.

(10) Patent No.: US 8,313,347 B2
(45) Date of Patent: Nov. 20, 2012

(54) USB MODEM

(75) Inventors: Jinjun He, Shenzhen (CN); Bin Zhang, Shenzhen (CN); Yaming Jiang, Shenzhen (CN); Qing Kang, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/339,148

(22) Filed: Dec. 28, 2011

(65) Prior Publication Data

US 2012/0100754 A1  Apr. 26, 2012

Related U.S. Application Data

(63) Continuation of application No. PCT/CN2010/074886, filed on Jul. 1, 2010.

(30) Foreign Application Priority Data

Jul. 1, 2009  (CN) ...................... 2009 2 0163825 U

(51) Int. Cl.
*H01R 13/648* (2006.01)
(52) U.S. Cl. ................................. 439/607.07
(58) Field of Classification Search ................ 439/76.1, 439/607.07, 141, 142, 135–136, 131, 95, 439/518, 638, 140
See application file for complete search history.

(56) References Cited

U.S. PATENT DOCUMENTS

| | | | |
|---|---|---|---|
| 6,676,419 B1 * | 1/2004 | Lin et al. ....................... | 439/76.1 |
| 6,999,322 B1 * | 2/2006 | Lin ............................... | 361/752 |
| 7,198,518 B1 * | 4/2007 | Liou ............................. | 439/630 |
| 7,544,073 B2 * | 6/2009 | Nguyen et al. ................ | 439/135 |
| 7,789,680 B2 * | 9/2010 | Hiew et al. .................... | 439/142 |
| 2007/0171620 A1 * | 7/2007 | Lee ................................ | 361/737 |
| 2008/0045049 A1 | 2/2008 | Collantes et al. | |

FOREIGN PATENT DOCUMENTS

| | | |
|---|---|---|
| CN | 2569210 Y | 8/2003 |
| CN | 2735508 Y | 10/2005 |
| CN | 101459706 A | 6/2009 |

OTHER PUBLICATIONS

Written Opinion of the International Searching Authority issued in corresponding PCT Patent Application No. PCT/CN2010/074886, mailed Oct. 21, 2010.

International Search Report issued in corresponding PCT Patent Application No. PCT/CN2010/074886, mailed Oct. 21, 2010.

* cited by examiner

*Primary Examiner* — Edwin A. Leon
(74) *Attorney, Agent, or Firm* — Brinks Hofer Gilson & Lione

(57) ABSTRACT

A Universal Serial Bus (USB) modem is provided. The USB modem includes a USB plug (1), a Printed Circuit Board (PCB) (2), and a signal input apparatus (3) that connects the USB plug (1) and the PCB (2). The signal input apparatus includes: a support (4) that is disposed on the PCB (2), in which the USB plug is disposed on the support (4); and a connector (5) that is disposed on the PCB and capable of being connected to the USB plug (5). The USB modem implements signal input by adopting the connector (5), thereby extending the service life of the USB modem and greatly reducing the cost.

6 Claims, 4 Drawing Sheets

USB MODEM

CROSS-REFERENCE TO RELATED APPLICATIONS

This application is a continuation of International Application No. PCT/CN2010/074886, filed on Jul. 1, 2010, which claims priority to Chinese Patent Application No. 200920163825.X, filed on Jul. 1, 2009, both of which are hereby incorporated by reference in their entireties.

FIELD OF THE UTILITY MODEL

The present utility model relates to a USB modem, and in particular, to a push-pull USB modem.

BACKGROUND OF THE UTILITY MODEL

Signal input of existing Universal Serial Bus (USB) modems are implemented by adopting a Flexible Printed Circuit (FPC). The signal input apparatuses of a push-pull USB stick include the FPC connected to a Printed Circuit Board (PCB) and a support fixed together with the FPC. A USB plug and the support are an integrated structure. A horizontal return spring and a push button are disposed on the support, and the support serves as a movable mechanism. The support loaded with the USB plug can retract or project out after the push button is pushed so that the USB modem can be in non-working or working state. The USB modem transmits data through the FPC and the PCB. During the implementation of the embodiments of the present utility model, the inventors find that as such existing signal input apparatus implements signal input by adopting an FPC, the FPC may easily wear out, thereby reducing the service life of the USB modem and increasing the implementation cost of the USB modem.

SUMMARY OF THE UTILITY MODEL

To solve the preceding technical problem, the present utility model provides a USB modem that implements signal input by adopting a connector, thereby extending the service life of the USB modem and greatly reducing the cost.

The USB modem provided in the embodiments of the present utility model includes a USB plug, a PCB, and a signal input apparatus that connects the USB plug and the PCB. The signal input apparatus includes:

a support that is disposed on the PCB, in which the USB plug is disposed on the support; and a connector that is disposed on the PCB and capable of being connected to the USB plug.

In view of the preceding solution, the present utility model is significantly advantageous over the existing structure: The signal input apparatus of the USB modem provided in the embodiments of the present utility model takes a connector as the medium for connecting the USB plug to the PCB for the purpose of signal transmission, thereby extending the service life of the USB modem and significantly reducing the cost.

BRIEF DESCRIPTION OF THE DRAWINGS

To describe the technical solutions in the embodiments of the present utility model more clearly, the following outlines the accompanying drawings for illustrating such technical solutions. Apparently, the accompanying drawings outlined below are some embodiments of the present utility model, and those of ordinary skill in the art can derive other drawings from such accompanying drawings without creative efforts.

DETAILED DESCRIPTION OF THE EMBODIMENTS

The following describes the technical solutions in the embodiments of the present utility model clearly with reference to the accompanying drawings in the embodiments of the present utility model. Apparently, the described embodiments are only some rather than all embodiments of the present utility model. Other embodiments those of ordinary skill in the art derive from the embodiments of the present utility model without creative efforts shall fall within the scope of the present utility model.

Embodiment 1

Figure 1:
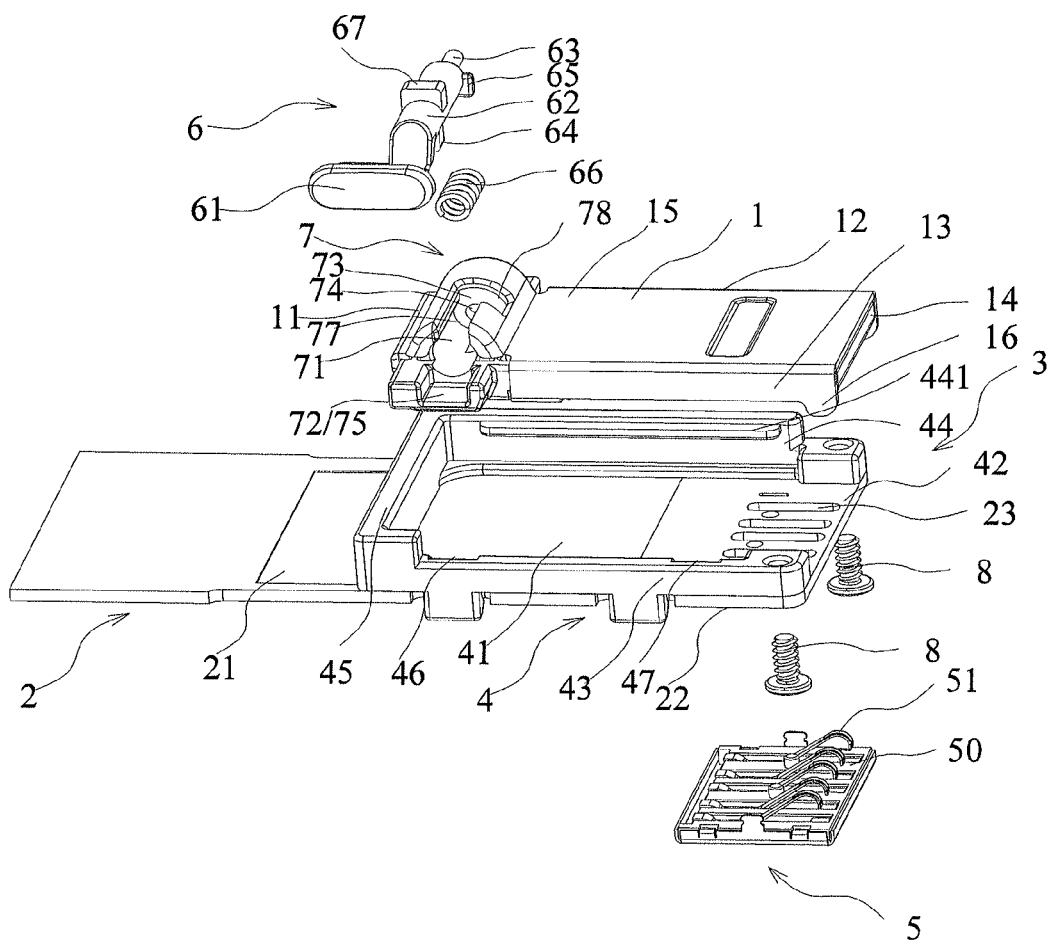
FIG. 1 is a schematic exploded diagram of an USB modem according to embodiment 1 of the present utility model.

As shown in FIG. 1, an embodiment of the present utility model provides a data card, and the data card is a USB modem, for example, a push-pull USB modem. The USB modem includes a USB plug 1, a PCB 2, and a signal input apparatus 3 that connects the USB plug 1 and the PCB 2. Specifically, the signal input apparatus 3 includes:

a support 4 disposed on the PCB 2 (For example, the support 4 is fixed on a lateral surface 21 of the PCB 2), in which the support 4 is disposed with a containing space 41 and separated from the USB plug 1, the USB plug 1 is slidably mounted inside the containing space 41 and is disposed on the support 4, and the USB plug 1 may be a non-standard customized piece; and a connector 5, in which the connector 5 is preferably disposed on another lateral surface 22 of the PCB 2 fixedly through fasteners 8 such as screws, may also be a non-standard customized piece to match the USB plug 1, and has a plurality of elastic sheets 51; the elastic sheets 51 can run through the corresponding number of thru-holes 23 disposed on the PCB 2 to connect to a contact sheet 17 (referring to FIG. 3) of the USB plug 1 so that the USB plug 1 can slide relative to the connector 5 to connect to or disconnect from the connector 5.

The USB modem provided in this embodiment of the present utility model takes the connector 5 as the medium for connecting the USB plug 1 to the PCB 2 for the purpose of signal transmission, thereby significantly reducing the cost. In addition, the support 4 and the USB plug 1 mounted inside the support 4 can work as a modular movable mechanism, facilitate standardization, provide good compatibility, further reduce the cost, and solve the technical problem in the prior art that the support working as a movable mechanism provides no compatibility due to appearance of industry design (ID) and varied structures and has high cost.

In this embodiment, the USB plug 1 is slidably mounted inside the containing space 41 of the support 4, and the connector 5 is mounted fixedly. In this way, the USB plug 1 can slide to and fro within the containing space 41 of the support 4 to connect to or disconnect from the connector 5. Similarly, the USB plug 1 can be mounted fixedly on the PCB 2, and the connector 5 can be slidably disposed on the PCB 2. In this way, the connector 5 can slide to and fro relative to the PCB 2 to connect to or disconnect from the USB plug 1. In this solution, however, the connection relationship between the connector 5 and the PCB 2 should be considered to maintain the connectivity in the sliding state. In this case, the USB plug 1 and the support 4 should be preferably integrated as in the prior art.

Preferably, the support 4 includes a rectangular frame having an opening 42 for the USB plug 1 to slide into or out of the containing space 41. The rectangular frame includes two long sides 43 and 44 extending towards the sliding direction of the USB plug 1 and a short side 45 perpendicular to the long sides 43 and 44. The USB plug 1 has an inner end 11 facing the short side 45, two side walls 12 and 13, and an outer end 14. A push button 6 is disposed on the inner end 11 of the USB plug 1. Positioning notches 46 and 47 are disposed on the inner side of the long side 43 of the rectangular frame of the support 4. When the push button 6 is in a state of being in the positioning notches 46 and 47 separately, the contact sheet of the USB plug 1 and the elastic sheet 51 of the connector 5 are in a contact or non-contact state so that the USB plug 1 is connected to or disconnected from the connector 5.

Preferably, a slide rail and a slide groove in cooperation with each other are disposed between the inner side of the other long side 44 of the rectangular frame of the support 4 and the side wall 12 next to the USB plug 1 so as to effectively guide the relative motion between the USB plug 1 and the connector 5. As shown in FIG. 1, a slide groove 441 is disposed on the inner side of the long side 44, and a slide rail (not shown) is disposed on the side wall 12 of the USB plug 1. The slide rail and the slide groove 441 can slidably match. Apparently, the positions of the slide groove and the slide rail are interchangeable. No further accompanying drawings are provided.

Preferably, a push button mounting part 7 is disposed on the inner end 11 of the USB plug 1; the push button mounting part is disposed with a mounting pocket 71 extending towards the direction perpendicular to the sliding direction of the USB plug 1. The mounting pocket 71 has an opening end 72 and an inner end 73. A pivot hole 74 and a slide groove 75 are respectively disposed on the inner end 73 and the opening end 72 of the mounting pocket 71. The push button 6 includes a button part 61, a rod body 62, and a pivot shaft 63 connected to each other. A positioning block 64 and a stop block 65 are disposed below the rod body 62. After a compression spring 66 is sleeved onto the pivot shaft 63, the pivot shaft 63 is inserted into the pivot hole 74 of the mounting pocket 71, the compression spring 66 is abutted against the inner side of the stop block 65, the rod body 62 is contained in the mounting pocket 71, and the positioning block 64 is contained in the slide groove 75, so that the push button 6 slidably matches the push button mounting part 7, and the positioning block 64 of the push button 6 slides outward along the slide groove 75 due to the pretightening force of the compression spring 66. The protruding part of the positioning block 64 beyond the slide groove 75 is positioned in the positioning notch 46 or 47 of the support 4. A guide block 67 is disposed above the rod body 62 and between the positioning block 64 and the stop block 65. A first gap 77 matching the guide block 67 and a second gap 78 matching the stop block 65 are disposed above the mounting pocket 71. To mount the push button 6, the push button 6 is rotated 90 degrees counter clockwise relative to the direction shown in FIG. 1 so that the stop block 65 is in an upright state, the push button 6 is placed in the mounting pocket 71, and then the push button 6 is rotated 90 degrees clockwise so that the stop block 65 passes through the second gap 78, and is rotated downward to be in a horizontal state, so as to be abutted against the compression spring 66.

The connector 5 further includes a plastic bracket 50 and a shielding cover (not shown). Elastic sheets 51 are disposed on the plastic bracket 50, and the shielding cover covers the outside of the plastic bracket 50 so that the USB plug 1 has the self-shielding function. The USB plug 1 has a metal casing 15, and one elastic sheet 51 of the connector 5 contacts the metal casing 15 for the purpose of grounding. The outer end 14 of the USB plug 1 is disposed with a limiting convex part 16 fastened onto the support 4 and extending towards the direction perpendicular to the sliding direction of the USB plug 1 to prevent the USB plug 1 from retracting excessively.

Figure 2:
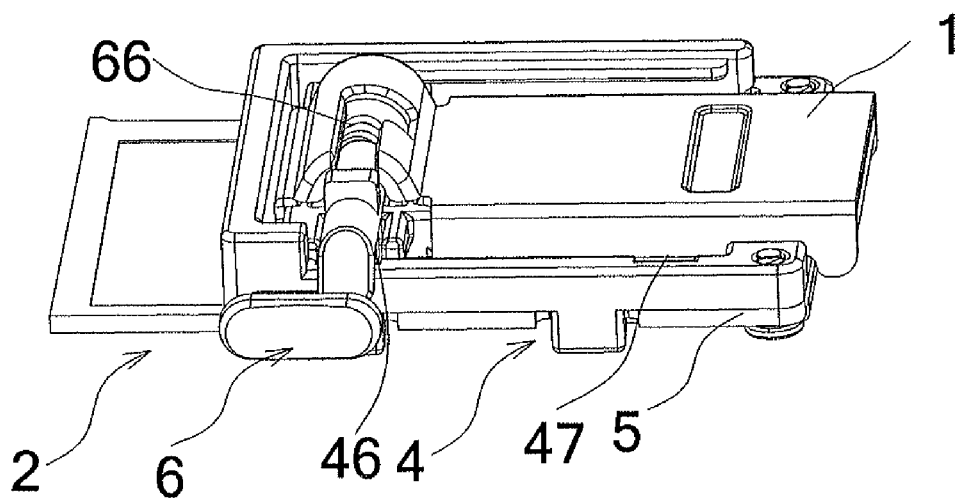
FIG. 2 is a three-dimensional diagram of the USB modem in a non-working state according to embodiment 1 of the present utility model.
Figure 3:
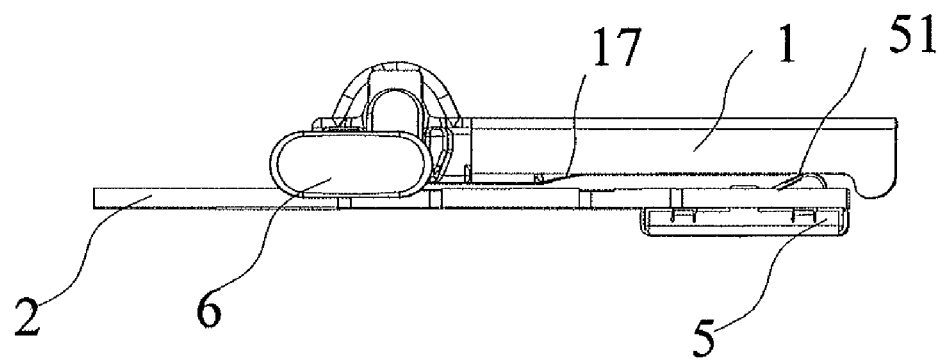
FIG. 3 is a lateral diagram of the USB modem of FIG. 2 without a support.

The action process in the embodiments of the present utility model is as follows:

As shown in FIGS. 2 and 3, the USB plug 1 is in a retracted state, that is, non-working state. In this case, the push button 6 is positioned in the positioning notch 46 of the support 4 due to the elastic pre-pressing of the compression spring 66, and the elastic sheet 51 of the connector 5 is disconnected from the contact sheet 17 of the USB plug 1. After that, the USB modem is in the non-working state.

Figure 4:
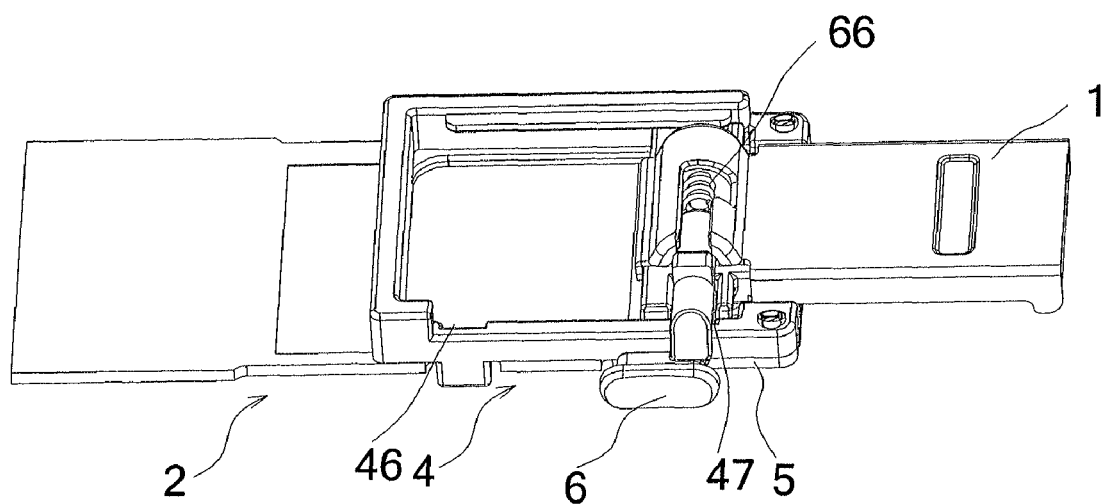
FIG. 4 is a three-dimensional diagram of the USB modem in a working state according to embodiment 1 of the present utility model.
Figure 5:
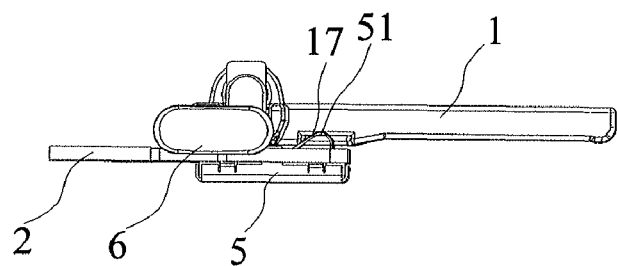
FIG. 5 is a lateral diagram of the USB modem of FIG. 4 without a support.

As shown in FIGS. 4 and 5, the USB plug 1 is changed from the retracted state to the projected state, that is, from the non-working state to the working state. In the state shown in FIGS. 2 and 3, first the push button 6 is pressed to overcome the prestress of the compression spring 66 so that the positioning block 64 of the push button 6 retracts inwards from the slide groove 75 and disengages from the positioning notch 46. As a result, the push button 6 disconnects from the support 4. Then, the push button 6 is pushed forward so that the push button 6, the compression spring 66, and the USB plug 1 are all pushed out. At the end position, the pressure on the push button 6 is cancelled. Because the push button 6 is under the action of the elasticity of the compression spring 66, the positioning block 64 is positioned in the positioning notch 47 of the support 4, and the contact sheet 17 of the USB plug 1 connects to the elastic sheet 51 of the connector 5. After that, the USB modem is in the working state.

As shown in FIGS. 2 and 3, the USB plug 1 is changed from the projected state to the retracted state, that is, from the working state to the non-working state. In the state shown in FIGS. 4 and 5, first the push button 6 is pressed to overcome the pressure of the compression spring 66 so that the positioning block 64 of the push button 6 retracts inwards from the slide groove 75 and disengages from the positioning notch 47. As a result, the push button 6 disconnects from the support 4. Then, the push button 6 is pulled backward so that the push button 6, the compression spring 66, and the USB plug 1 move backward together. At the end position, the acting force on the push button 6 is cancelled. Because the push button 6 is under the action of the elasticity of the compression spring 66, the positioning block 64 is positioned in the positioning notch 47 of the support 4 again, and the elastic sheet 51 of the connector 5 disconnects from the contact sheet 17 of the USB plug 1. After that, the USB modem is in the non-working state.

Embodiment 2

Figure 6:
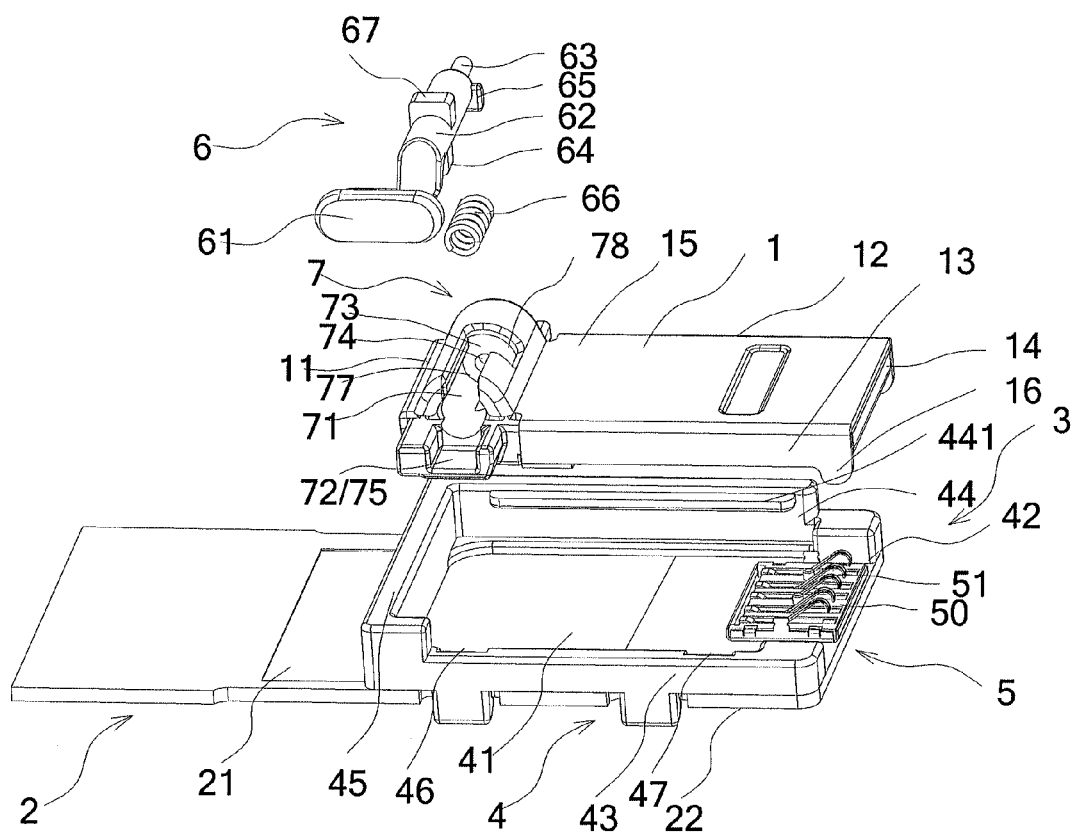
FIG. 6 is a schematic exploded diagram of a USB modem according to embodiment 2 of the present utility model.

As shown in FIG. 6, the main structure, principle, and effect of this embodiment are the same as those of embodiment 1, so they are omitted here. The difference lies in that the support 4 and the connector 5 are fixed on a same lateral surface 21 of the PCB 2, and the connector 5 is placed in the containing space 41 of the support. In this case, the USB plug 1 should be disposed with a slide space (not shown) on the side next to the connector 5; the connector 5 is placed in the slide space. In this way, the position of the connector 5 relative to the USB plug 1 changes when the USB plug 1 slides so that the connector 5 connects to or disconnects from the contact sheet of the USB plug 1. In this embodiment, the action process of the USB modem is the same as that in embodiment 1, so it is omitted here.

In view of the technical solutions of the preceding embodiments, the present utility model is significantly advantageous over the existing structure: The signal input apparatus of the USB modem provided in the embodiments of the present utility model takes a connector as the medium for connecting the USB plug to the PCB for the purpose of signal transmission, thereby extending the service life of the USB modem and significantly reducing the cost.

The preceding embodiments of the present utility model shall be interpreted as being descriptive instead of restrictive. The equivalent variations and modifications made according to the present utility model, including any USB modems (including push-pull USB modems) that implement signal input by adopting a connector, shall fall within the scope of the present utility model.

What is claimed is:

1. A Universal Serial Bus (USB) modem, comprising a USB plug, a Printed Circuit Board (PCB), and a signal input apparatus that connects the USB plug and the PCB, wherein the signal input apparatus comprises:
    a support fixed on the PCB, wherein the USB plug is disposed on the support; and
    a connector fixed on the PCB and capable of being connected to the USB plug;
    wherein the support is separated from the USB plug and disposed with a containing space, the USB plug is slidably mounted inside the containing space and slides relative to the connector to connect to or disconnect from the connector;
    wherein the support and the connector are fixed on a same lateral surface of the PCB, the connector is placed in the containing space of the support, the USB plug is disposed with a slide space on a side next to the connector, and the connector is placed in the slide space; and
    wherein the support further comprises a rectangular frame having an opening; the rectangular frame comprises two long sides extending towards a sliding direction of the USB plug and a short side perpendicular to the long sides; the USB plug has an inner end facing the short side, two side walls, and an outer end; a push button is disposed on the inner end of the USB plug; two positioning notches are disposed on the inner side of one long side of the rectangular frame of the support; when the push button is in a state of being in the two positioning notches separately, the USB plug and the connector are in a connected or disconnected state.

2. The USB modem according to claim 1, wherein a slide rail and a slide groove in cooperation with each other are disposed between the inner side of the other long side of the rectangular frame of the support and a side wall next to the USB plug.

3. The USB modem according to claim 1, wherein: a push button mounting part is disposed on the inner end of the USB plug, and the push button mounting part is disposed with a mounting pocket extending towards a direction perpendicular to the sliding direction of the USB plug; the mounting pocket has an opening end and an inner end; a pivot hole and a slide groove are respectively disposed on the inner end and the opening end of the mounting pocket; the push button comprises a button part, a rod body, and a pivot shaft connected to each other; a positioning block and a stop block are disposed below the rod body; after a compression spring is sleeved onto the pivot shaft, the pivot shaft is inserted into the pivot hole of the mounting pocket, the compression spring is abutted against one side of the stop block, the rod body is contained in the mounting pocket, the positioning block is contained in the slide groove, and a protruding part of the positioning block beyond the slide groove is positioned in the positioning notch.

4. The USB modem according to claim 3, wherein: a guide block is disposed above the rod body and between the positioning block and the stop block; a first gap matching the guide block and a second gap matching the stop block are disposed above the mounting pocket.

5. The USB modem according to claim 1, wherein: the connector further comprises a plastic bracket and a shielding cover; the elastic sheets are fixed on the plastic bracket, and the shielding cover covers the outside of the plastic bracket; the USB plug is disposed with a metal casing, and one elastic sheet of the connector contacts the metal casing.

6. The USB modem according to claim 1, wherein the outer end of the USB plug is disposed with a limiting convex part fastened onto the support and extending towards the direction perpendicular to the sliding direction of the USB plug.

* * * * *